United States Patent Office 2,799,706
Patented July 16, 1957

2,799,706

CYCLIC KETONES AND THEIR PREPARATION

Walter Kimel, Highland Park, and Norbert William Sax, Little Falls, N. J., assignors to Hoffmann-La Roche Inc., Nutley, N. J., a corporation of New Jersey No Drawing. Application June 22, 1956,
Serial No. 593,033

12 Claims. (Cl. 260—586)

This invention relates to novel chemical compounds and to a method of preparing the same. More particularly, the invention relates to compounds having the general formula (I) 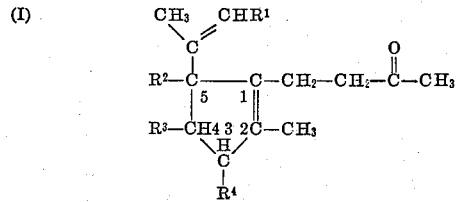

wherein each of the symbols $R^1$, $R^2$, $R^3$ and $R^4$ represents a member selected from the group consisting of hydrogen and lower acyclic hydrocarbon radicals; and to a preferred process of preparing said compounds. By "lower acyclic hydrocarbon radical" is meant an acyclic hydrocarbon radical having less than eight carbon atoms, including both saturated and unsaturated radicals, such as methyl, ethyl, isopropyl, n-butyl, allyl, propargyl, and the like.

The compounds of the invention having the above general formula are useful as odor-imparting agents, for example in the preparation of perfumes, soaps and scented compositions generally. These compounds possess characteristic fragrances generally reminiscent of violet and orris.

The starting materials employed in the preferred process of the invention are the alcohols which can be represented by the general formula (II) 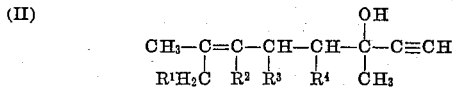

and their corresponding acetoacetic acid esters which can be represented by the general formula (III) 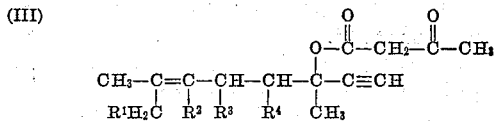

In the foregoing formulas, $R^1$, $R^2$, $R^3$ and $R^4$ have the same significance previously indicated, with the further proviso that any particular symbol has the identical significance in each of the Formuls I, II and III above.

The alcohols of Formula II above can be made conveniently by a general process which comprises reacting a ketone of the formula (IV) 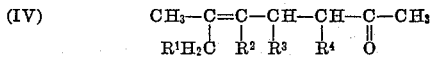

wherein the symbols $R^1$, $R^2$, $R^3$ and $R^4$ have the same meaning indicated above, with an alkali metal acetylide in liquid ammonia, and hydrolyzing the intermediate condensation product.

The acetoacetic acid esters of Formula III above can be made conveniently by a general process which comprises condensing an alcohol of Formula II above with diketene.

A preferred process of making the compounds of the invention having the formula

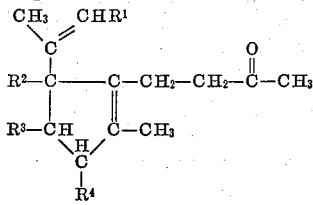

comprises heating a compound of the formula

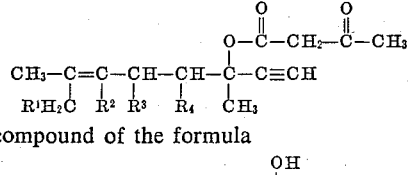

with a compound of the formula

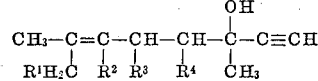

at a temperature between about 130° C. and about 160° C.; wherein, in the foregoing formulas, each of the symbols $R^1$, $R^2$, $R^3$ and $R^4$ represents a member selected from the group consisting of hydrogen and lower acyclic hydrocarbon radicals, and any particular symbol has the identical significance in each of the three formulas.

The invention is further disclosed in the following examples, which are illustrative but not limitative thereof. Temperatures are stated in degrees centigrade, uncorrected.

*Example 1*

A mixture of 236 g. of racemic 3,7-dimethyl-6-octen-1-yn-3-ol (dehydrolinalool) and 236 g. of 3,7-dimethyl-6-octen-1-yn-3-yl acetoacetate (prepared by condensing diketene with racemic dehydrolinalool) was heated by an oil bath to about 150°, while stirring vigorously. A slow evolution of carbon dioxide occurred. This terminated after about eight hours. The source of heat was then removed, and the reaction mixture was cooled. The desired reaction product, 4-(2-methyl-5-isopropenyl-1-cyclopenten-1-yl)-2-butanone, was isolated by fractional distillation in vacuo. It had B. P. 72°–75° (0.5 mm.); $n_D^{25}$=1.4800; semicarbazone (from 50% ethanol) M. P. 136°; 4-phenylsemicarbazone (from 50% ethanol), M. P. 101°; 2,4-dinitrophenylhydrazone (from ethanol), M. P. 87.5°.

*Example 2*

A mixture of 250 g. of racemic 3,6,7-trimethyl-6-octen-1-yn-3-ol and 250 g. of 3,6,7-trimethyl-6-octen-1-yn-3-yl acetoacetate (prepared by condensing diketene with racemic 3,6,7-trimethyl-6-octen-1-yn-3-ol) was placed in a 1-liter, 3-neck flask. The flask was then heated by an oil bathe to 150° so that carbon dioxide was eliminated from the reaction mixture. When the evolution of carbon dioxide had ceased, the mixture was diluted with 300 cc. of petroleum ether, and was extracted several times with saturated aqueous sodium bicarbonate solution in order to eliminate acidic byproducts, and was then washed with water until neutral. The organic layer was dried over calcium sulfate and subjected to vacuum fractional distillation. The product, 4-(2,5-dimethyl-5-isopropenyl-1-cyclopenten-1-yl)-2-butanone, was obtained in a fraction having B. P. 68°–70° (0.1 mm.); $n_D^{25}$=1.4839; semicarbazone M. P. 151°–152°.

*Example 3*

A mixture of 250 g. of racemic 3,7-dimethyl-6-nonen-1-yn-3-yl acetoacetate (prepared by condensing diketene with 3,7-dimethyl-6-nonen-1-yn-3-ol) and an equal weight of 3,7-dimethyl-6-nonen-1-yn-3-ol was placed in a 1-liter, 3-neck flask. The flask was then heated by an oil bath to such a temperature (150°–155°) that carbon dioxide was eliminated from the reaction mixture at a rate of about 0.1 mol per hour. After eight hours, the evolution of carbon dioxide had virtually ceased. The mixture was diluted with 300 cc. of petroleum ether, and was extracted several times with saturated aqueous sodium bicarbonate solution in order to eliminate acidic byproducts, and was then washed with water until neutral. The organic layer was dried over calcium sulfate and subjected to vacuum fractional distillation. The product, 4-[2-methyl-5-(2-buten-2-yl) - 1-cyclopenten-1-yl]-2-butanone, was obtained in a fraction having B. P. 88°–89° (0.6 mm.); $n_D^{25} = 1.4828$; M. P. of semicarbazone, 122°.

The starting materials for this example, 3,7-dimethyl-6-nonen-1-yn-3-ol and 3,7-dimethyl-6-nonen-1-yn-3-yl acetoacetate were prepared by the following procedure (not part of the present invention):

600 g. of 3-methyl-1-penten-3-ol was cooled to +15° with an ice bath, then 1800 cc. of concentrated aqueous hydrochloric acid (37%) was poured into the reaction vessel. The mixture was stirred for 30 minutes. The oil, comprising essentially 1-chloro-3-methyl-2-pentene, was separated, washed three times with 500 cc. of water and dried over calcium chloride.

Four liters of benzene, 1040 g. of ethyl acetoacetate and 378 g. of sodium methylate were stirred into a 12-liter flask. 696 g. of 1-chloro-3-methyl-2-pentene as produced above was added from a separatory funnel in two hours at 60°. The stirring was then continued at 60° overnight.

The mixture was diluted with four liters of water. The oil was separated and the benzene was distilled off under vacuum. The thick residue, 3-carbethoxy-6-methyl-5-octen-2-one, was placed in a 5-liter flask with 2 liters of ethyl alcohol, 1 liter of water and 500 g. of potassium hydroxide. This was stirred for two hours, then allowed to stand overnight, thereby forming the potassium salt of 3-carboxy-6-methyl-5-octen-2-one.

Concentrated hydrochloric acid was added to the stirred reaction mixture from a separatory funnel until strongly acid. The oil layer was removed, and the aqueous portion was extracted with one liter of benzene. The combined oils were water-washed and fractionated to yield 6-methyl-5-octen-2-one, distilling at 65° (10 mm.), $n_D^{25} = 1.4412$.

84 g. of metallic sodium was dissolved in 3 liters of liquid ammonia. Acetylene was bubbled into the stirred solution until its color changed from blue to white. 420 g. of 6-methyl-5-octen-2-one was dissolved in 500 cc. of diethyl ether and dropped into the stirred reaction mixture in one hour. Stirring was then continued for three hours while a slow stream of acetylene was bubbled in. The flow of acetylene was then stopped, but the stirring was continued for about 15 hours. The ammonia was distilled off and the residue in the reaction vessel was washed with 2 liters of 5% aqueous sulfuric acid. The product was water washed, dried over anhydrous calcium sulfate and fractionated to yield 3,7-dimethyl-6-nonen-1-yn-3-ol, distilling at 89° (10 mm.), $n_D^{25} = 1.4612$.

In a 2-liter, 3-neck flask equipped with a mechanical stirrer, thermometer and dropping funnel, 332.4 g. of 3,7-dimethyl-6-nonen-1-yn-3-ol was dissolved in a mixture of 330 cc. of petroleum ether, 4 cc. of pyridine and 4 cc. of acetic acid. To this solution was added, dropwise, during two hours, 185 g. of diketene, while maintaining a reaction temperature of 20°–30° by external cooling. The reaction was allowed to continue at that temperature for six hours longer. Then, the mixture was washed twice with 200 cc. portions of 10% aqueous sulfuric acid, six times with 200 cc. of aqueous saturated sodium bicarbonate solution, and finally with water until neutral. The petroleum ether layer was dried over anhydrous calcium sulfate, and the solvent was removed by distillation in vacuo, leaving 3,7-dimethyl-6-nonen-1-yn-3-yl acetoacetate, $n_D^{25} = 1.4653$.

*Example 4*

A mixture of 278 g. of racemic 3,7,9-trimethyl-6-decen-1-yn-3-yl acetoacetate (prepared by condensing diketene with 3,7,9-trimethyl-6-decen-1-yn-3-ol) and an equal weight of 3,7,9-trimethyl-6-decen-1-yn-3-ol was placed in a 1-liter, 3-neck flask. The flask was then heated by an oil bath to 150°–155°, so that carbon dioxide was eliminated from the reaction mixture. After eight hours, the evolution of carbon dioxide had ceased. The mixture was diluted with 300 cc. of petroleum ether, and was extracted several times with saturated aqueous sodium bicarbonate solution, and was then washed with water until neutral. The organic layer was dried over calcium sulfate and subjected to vacuum fractional distillation. The product, 4-[2-methyl-5-(4-methyl-2-penten-2-yl)-1-cyclopenten-1-yl]-2-butanone, was obtained in a fraction having B. P. 96°–99° (0.3 mm.); $n_D^{25} = 1.4773$; M. P. of phenylsemicarbazone, 136°.

The starting materials for this example, 3,7,9-trimethyl-6-decen-1-yn-3-ol and 3,7,9-trimethyl-6-decen-1-yn-3-yl acetoacetate, were prepared by the following procedure (not part of the present invention):

438 g. of 3,5-dimethyl-1-hexen-3-ol was stirred with 1500 cc. of concentrated aqueous hydrochloric acid (37% by weight HCl) at room temperature for 30 minutes. The oil layer was separated, washed twice, each time with 500 cc. of water, and dried over calcium chloride. The product obtained, 1-chloro-3,5-dimethyl-2-hexene, had $n_D^{25} = 1.448$.

In a 5-liter flask there was placed 3 liters of benzene, 429 g. of ethyl acetoacetate and 162 g. of sodium methylate. 428 g. of the product obtained above, 1-chloro-3,5-dimethyl-2-hexene, was added at 60° within 30 minutes, and stirring was continued for six hours at 60°–70°. The reaction mixture was washed with 2 liters of water and the benzene was distilled off under a vacuum of 100 mm. to yield 3-carbethoxy-6,8-dimethyl-5-nonen-2-one as a straw-colored oil.

The entire quantity of 3-carbethoxy-6,8-dimethyl-5-nonen-2-one obtained above was dissolved in 2 liters of ethyl alcohol. To this was added 200 g. of solid potassium hydroxide and 200 cc. of water. The mixture was stirred for four hours at 40°–50°. To the resulting solution of the potassium salt of 3-carboxy-6,8-dimethyl-5-nonen-2-one was added concentrated aqueous hydrochloric acid (37% by weight HCl) from a separatory funnel until the solution was strongly acid. Thirty minutes were required for the addition. The solution was then stirred an additional hour at 50°.

The reaction mixture was diluted with 2 liters of water and the oil layer was removed by means of a separatory funnel. The aqueous portion was extracted with 500 cc. of benzene. The combined oils were washed neutral with water and fractionated. The product, 6,8-dimethyl-5-nonen-2-one, distilled at 120° (35 mm.), $n_D^{25} = 1.4432$. The 2,4-dinitrophenylhydrazone derivative melted at 47°. The semicarbazone derivative melted at 114°.

In 1.5 liters of liquid ammonia there was dissolved 41.4 g. of metallic sodium. Acetylene gas was passed into the blue colored solution, until the color changed to white. The addition of acetylene was continued for 30 minutes longer. Then a solution of 252 g. of 6,8-dimethyl-5-nonen-2-one, dissolved in 250 cc. of diethyl ether, was dropped in within 45 minutes. The stirring was continued for 15 hours while a slow stream of acetylene was bubbled into the reaction mixture.

The ammonia was thereupon evaporated from the reaction mixture with the aid of a slow stream of nitrogen.

The residue was poured into 2 liters of 5% sulfuric acid. The oil layer was removed and washed neutral with water. On fractionation, 3,7,9-trimethyl-6-decen-1-yn-3-ol was obtained in the fraction distilling at 72° (0.35 mm.), $n_D^{25}=1.4598$.

194.3 g. (1.0 mol) of 3,7,9-trimethyl-6-decen-1-yn-3-ol were dissolved in a mixture of 200 cc. of petroleum ether, 2 cc. of pyridine and 2 cc. of acetic acid. Over a period of two hours there was dropped into the reaction mixture 92.5 g. of diketene, while maintaining a reaction temperature of 20°–30 by external cooling. The reaction was allowed to continue at that temperature for six hours longer. Then the reaction mixture was washed well with dilute aqueous sulfuric acid, with saturated sodium bicarbonate solution, and with water until neutral. The petroleum ether layer was dried over anhydrous calcium sulfate, and the petroleum ether was distilled off in vacuo, leaving 3,7,9-trimethyl-6-decen-1-yn-3-yl acetoacetate; $n_D^{25}=1.4636$.

Example 5

A mixture of 264 g. of racemic 3,7-dimethyl-4-ethyl-6-octen-1-yn-3-yl acetoacetate (prepared by condensing diketene with 3,7-dimethyl-4-ethyl-6-octen-1-yn-3-ol) and 264 g. of 3,7-dimethyl-4-ethyl-6-octen-1-yn-3-ol was placed in a 1-liter, 3-neck flask. The flask was then heated by an oil bath to 150°–155°, so that carbon dioxide was eliminated from the reaction mixture. When the evolution of carbon dioxide had ceased, the mixture was diluted with 300 cc. of petroleum ether, and was extracted several times with saturated aqueous sodium bicarbonate solution, and was then washed with water until neutral. The organic layer was dried over calcium sulfate and subjected to vacuum fractional distillation. The product, 4-(2-methyl-3-ethyl-5-isopropenyl-1-cyclopenten-1-yl)-2-butanone, was obtained in a fraction having B. P. 90°–92° (0.4 mm.); $n_D^{25}=1.4785$; M. P. of semicarbazone, 97.5°.

The starting materials for this example, 3,7-dimethyl-4-ethyl-6-octen-1-yn-3-ol and 3,7-dimethyl-4-ethyl-6-octen-1-yn-3-yl acetoacetate, were prepared by the following procedure (not part of the present invention):

To a solution of 92 g. of sodium in 2 liters of ethanol was added, at 10°, 816 g. of 1,1-dimethyl-2-propen-1-yl acetoacetate. To this solution was added, during three hours at 10°, 436 g. of ethyl bromide. The mixture was stirred for 20 hours at room temperature. Then, the precipitate of sodium bromide was removed by filtration. The resulting solution was concentrated in vacuo, and the crude product was dissolved in petroleum ether. It was washed with ice-cold 4% aqueous sodium hydroxide solution to remove excess 1,1-dimethyl-2-propen-1-yl acetoacetate, with cold dilute acetic acid, and finally with water until neutral. The solvent layer was dried over calcium sulfate, concentrated, and finally distilled in vacuo. The product, dimethyl vinyl carbinyl α-ethyl-acetoacetate, was collected at 46°–51° (0.9 mm.); $n_D^{25}=1.4352$.

400 g. of dimethyl vinyl carbinyl α-ethyl-acetoacetate was placed in a 1-liter, 3-neck flask, and, with vigorous stirring, was heated to 160°–170°, whereupon a rapid evolution of carbon dioxide occurred. Heating was continued until the evolution of gas ceased. The product, 3-ethyl-6-methyl-5-hepten-2-one, was isolated by vacuum fractional distillation. It had B. P. 69°–70° (7 mm.); $n_D^{25}=1.4401$.

Acetylene was bubbled rapidly into a solution of 138 g. of sodium in 2 liters of liquid ammonia until the characteristic blue color disappeared. Then, while the addition of acetylene was continued at a diminished rate, a solution of 770 g. of 3-ethyl-6-methyl-5-hepten-2-one in 750 cc. of dry diethyl ether was added, dropwise, with efficient stirring, during two hours. Stirring was continued for 20 hours, in an acetylene atmosphere. Then, the ammonia was removed by evaporation, and the resulting solution was poured cautiously, with external cooling, into 2.5 liters of a stirred solution of 15% aqueous sulfuric acid, at such a rate that the temperature did not exceed 20°. The organic layer was separated, and the aqueous layer was extracted with 250 cc. of diethyl ether. The combined ether layers were washed with sodium bicarbonate solution, and then with water until neutral. After being dried over calcium sulfate, the organic portion was concentrated in vacuo and distilled. The product, 3,7-dimethyl-4-ethyl-6-octen-1-yn-3-ol, was obtained as a colorless liquid at 69°–70° (1 mm.); $n_D^{25}=1.4669$.

To a mixture of 405.7 g. of 3,7-dimethyl-4-ethyl-6-octen-1-yn-3-ol and 400 cc. of petroleum ether was added 4.5 cc. each of pyridine and acetic acid. To this solution was added dropwise, with stirring, 208.1 g. of diketene over a period of two hours. Sufficient external cooling was employed to maintain a reaction temperature of 25°–30°. After eight hours, the reaction mixture was washed successively with 15% aqueous sulfuric acid, saturated aqueous sodium bicarbonate solution, and then water until neutral. It was dried over calcium sulfate, and concentrated in vacuo, leaving the product, 3,7-dimethyl-4-ethyl-6-octen-1-yn-3-yl acetoacetate;

$$n_D^{25}=1.4701$$

Example 6

A mixture of 276 g. of racemic 3,7-dimethyl-4-allyl-6-octen-1-yn-3-yl acetoacetate (prepared by condensing diketene with 3,7-dimethyl-4-allyl-6-octen-1-yn-3-ol) and 276 g. of 3,7-dimethyl-4-allyl-6-octen-1-yn-3-ol was placed in a 1-liter, 3-neck flask. The flask is then heated by an oil bath to 150° so that carbon dioxide was eliminated from the reaction mixture. When the evolution of carbon dioxide had ceased, the mixture was diluted with 300 cc. of petroleum ether, and was extracted several times with saturated aqueous sodium bicarbonate solution, and was then washed with water until neutral. The organic layer was dried over calcium sulfate and subjected to vacuum fractional distillation. The product, 4-(2-methyl-3-allyl-5-isopropenyl-1-cyclopenten-1-yl)-2-butanone, was obtained in a fraction having B. P. 90°–92° (0.3 mm.); $n_D^{25}=1.4888$; M. P. of semicarbazone, 119°–120°.

The starting materials for this example, 3,7-dimethyl-4-allyl-6-octen-1-yn-3-ol and 3,7-dimethyl-4-allyl-6-octen-1-yn-3-yl acetoacetate, were prepared by the following procedure (not part of the present invention):

To a solution of 92 g. of sodium in 2 liters of ethanol was added, at 10°, 816 g. of 1,1-dimethyl-2-propen-1-yl acetoacetate. To this solution was added, during three hours at 10°, 484 g. of allyl bromide. The mixture was stirred for 20 hours at room temperature. Then, the precipitate of sodium bromide was removed by filtration. The resulting solution was concentrated in vacuo, and the crude product was dissolved in petroleum ether. It was washed with ice-cold 4% aqueous sodium hydroxide solution to remove excess 1,1-dimethyl-2-propen-1-yl acetoacetate, with cold dilute acetic acid, and finally with water until neutral. The solvent layer was dried over calcium sulfate, concentrated, and finally distilled in vacuo. The product, dimethyl vinyl carbinyl α-allyl-acetoacetate, was collected at 53°–59° (0.2 mm.); $n_D^{25}=1.4475$.

400 g. of dimethyl vinyl carbinyl α-allyl-acetoacetate was placed in a 1-liter, 3-neck flask, and, with vigorous stirring, was heated to 160°–170°, whereupon a rapid evolution of carbon dioxide occurred. Heating was continued until the evolution of gas ceased. The product, 3-allyl-6-methyl-5-hepten-2-one, was isolated by vacuum fractional distillation. It had B. P. 81°–82° (7 mm.); $n_D^{25}=1.4550$.

Acetylene was bubbled rapidly into a solution of 138 g. of sodium in 2 liters of liquid ammonia until the characteristic blue color disappeared. Then, while the addition of acetylene was continued at a diminishtd rate, a solution of 830 g. of 3-allyl-6-methyl-5-hepten-2-one in 750 cc. of dry diethyl ether was added, dropwise, with efficient stirring during two hours. Stirring was continued for 20 hours, in an acetylene atmosphere. Then, the ammonia was removed by evaporation, and the resulting solution was poured cautiously, with external cooling, into 2.5 liters of a stirred solution of 15% aqueous sulfuric acid, at such a rate that the temperature did not exceed 20°. The organic layer was separated, and the aqueous layer was extracted with 250 cc. of diethyl ether. The combined ether layers were washed with sodium bicarbonate solution, and then with water until neutral. After being dried over calcium sulfate, the organic portion was concentrated in vacuo and distilled. The product, 3,7-dimethyl-4-allyl-6-octen-1-yn-3-ol, was obtained as a colorless liquid at 72°–74° (0.3 mm.); $n_D^{25} = 1.4771$.

To a mixture of 432 g. of 3,7-dimethyl-4-allyl-6-octen-1-yn-3-ol and 400 cc. of petroleum ether was added 4.5 cc. each of pyridine and acetic acid. To this solution was added dropwise, with stirring, 208.1 g. of diketene over a period of two hours. Sufficient external cooling was employed to maintain a reaction temperature of 25°–30°. After eight hours, the reaction mixture was washed successively with 15% aqueous sulfuric acid, saturated aqueous sodium bicarbonate solution, and then water until neutral. It was dried over calcium sulfate, and concentrated in vacuo, leaving the product, 3,7-dimethyl-4-allyl-6-octen-1-yn-3-yl acetoacetate, $n_D^{25} = 1.4781$.

*Example 7*

A mixture of 274 g. of racemic 3,7-dimethyl-4-propargyl-6-octen-1-yn-3-yl acetoacetate (prepared by condensing diketene with 3,7-dimethyl-4-propargyl-6-octen-1-yn-3-ol) and 274 g. of 3,7-dimethyl-4-propargyl-6-octen-1-yn-3-ol was placed in a 1-liter, 3-neck flask. The flask was then heated by an oil bath to 150° so that carbon dioxide was eliminated from the reaction mixture. When the evolution of carbon dioxide had ceased, the mixture was diluted with 300 cc. of petroleum ether, and was extracted several times with saturated aqueous sodium bicarbonate solution, and was then washed with water until neutral. The organic layer was dried over calcium sulfate and subjected to vacuum fractional distillation. The product, 4-(2-methyl-3-propargyl-5-isopropenyl-1-cyclopenten-1-yl)-2-butanone, was obtained in a fraction having B. P. 101°–103° (0.4 mm.); $n_D^{25} = 1.4952$; M. P. of semicarbazone, 110°–111°.

The starting materials for this example, 3,7-dimethyl-4-propargyl-6-octen-1-yn-3-ol and 3,7-dimethyl-4-propargyl-6-octen-1-yn-3-yl acetoacetate, were prepared by the following procedure (not part of the present invention):

To a solution of 92 g. of sodium in 2 liters of ethanol was added, at 10°, 816 g. of 1,1-dimethyl-2-propen-1-yl acetoacetate. To this solution was added, during three hours at 10°, 476 g. of propargyl bromide. The mixture was stirred for 20 hours at room temperature. Then, the precipitate of sodium bromide was removed by filtration. The resulting solution was concentrated in vacuo, and the crude product was dissolved in petroleum ether. It was washed with ice-cold 4% aqueous sodium hydroxide solution to remove excess 1,1-dimethyl-2-propen-1-yl acetoacetate, with cold dilute acetic acid, and finally with water until neutral. The solvent layer was dried over calcium sulfate, concentrated, and finally distilled in vacuo. The product, dimethyl vinyl carbinyl α-propargyl-acetoacetate, was collected at 70° (0.5 mm.); $n_D^{25} = 1.454$.

400 g. of dimethyl vinyl carbinyl α-propargyl-acetoacetate was placed in a 1-liter, 3-neck flask, and, with vigorous stirring, was heated to 160°–170°, whereupon a rapid evolution of carbon dioxide occurred. Heating was continued until the evolution of gas ceased. The product, 3-propargyl-6-methyl-5-hepten-2-one, was isolated by vacuum fractional distillation. It had B. P. 100°–103° (13 mm.); $n_D^{25} = 1.4639$.

Acetylene was bubbled rapidly into a solution of 138 g. of sodium in 2 liters of liquid ammonia until the characteristic blue color disappeared. Then, while the addition of acetylene was continued at a diminished rate, a solution of 820 g. of 3-propargyl-6-methyl-5-hepten-2-one in 750 cc. of dry diethyl ether was added, dropwise, with efficient stirring, during two hours. Stirring was continued for 20 hours, in an acetylene atmosphere. Then, the ammonia was removed by evaporation, and the resulting solution was poured cautiously, with external cooling, into 2.5 liters of a stirred solution of 15% aqueous sulfuric acid, at such a rate that the temperature did not exceed 20°. The organic layer was separated, and the aqueous layer was extracted with 250 cc. of diethyl ether. The combined ether layers were washed with sodium bicarbonate solution, and then with water until neutral. After being dried over calcium sulfate, the organic portion was concentrated in vacuo and distilled. The product, 3,7-dimethyl-4-propargyl-6-octen-1-yn-3-ol, was obtained as a colorless liquid at 83°–86° (0.7 mm.); $n_D^{25} = 1.4645$.

To a mixture of 428 g. of 3,7-dimethyl-4-propargyl-6-octen-1-yn-3-ol and 400 cc. of petroleum ether was added 4.5 cc. each of pyridine and acetic acid. To this solution was added dropwise, with stirring, 208.1 g. of diketene over a period of two hours. Sufficient external cooling was employed to maintain a reaction temperature of 25°–30°. After eight hours, the reaction mixture was washed successively with 15% aqueous sulfuric acid, saturated aqueous sodium bicarbonate solution, and then water until neutral. It was dried over calcium sulfate, and concentrated in vacuo, leaving the product, 3, 7-dimethyl - 4 - propargyl - 6 - octen-1-yn-3-yl acetoacetate, $n_D^{25} = 1.4840$.

*Example 8*

A mixture of 278 g. of racemic 3,7-dimethyl-4-ethyl-6-nonen-1-yn-3-yl acetoacetate (prepared by condensing diketene with 3,7-dimethyl-4-ethyl-6-nonen-1-yn-3-ol) and 278 g. of 3,7-dimethyl-4-ethyl-6-nonen-1-yn-3-ol was placed in a 1-liter, 3-neck flask. The flask was then heated by an oil bath to 150°–155° so that carbon dioxide was eliminated from the reaction mixture. When the evolution of carbon dioxide had ceased, the mixture was diluted with 300 cc. of petroleum ether, and was extracted several times with saturated aqueous sodium bicarbonate solution, and was then washed with water until neutral. The organic layer was dried over calcium sulfate and subjected to vacuum fractional distillation. The product, 4-[2-methyl-3-ethyl-5-(2-buten-2-yl)-1-cyclopenten-1-yl]2-butanone, was obtained in a fraction having B. P. 94° (0.5 mm.); $n_D^{25} = 1.4830$; M. P. of semicarbazone, 125°–126°.

The starting materials for this example, 3,7-dimethyl-4-ethyl-6-nonen-1-yn-3-ol and 3,7 - dimethyl-4-ethyl-6-nonen-1-yn-3-yl acetoacetate, were prepared by the following procedure (not part of the present invention):

A 2-liter, 3-neck flask equipped with a stirrer, thermometer, dropping funnel and reflux condenser, was charged with 200.4 g. of ethyl methyl vinyl carbinol, 200 cc. of petroleum ether (B. P. 60°), 4 cc. of pyridine and 4 cc. of acetic acid. To the mixture was added, dropwise, with efficient stirring, 185 g. of diketene during two hours. The temperature was maintained at 25°–30° by external cooling. Stirring was continued at 25°–30° for four hours after the addition of diketene was complete. Then, the reaction mixture was washed in a separatory funnel twice with 200 cc. portions of 7% aqueous sulfuric acid, followed by 200 cc. of water, three times with 200 cc. portions of saturated aqueous sodium bicarbonate, and finally with water until neutral. The organic layer was dried over anhydrous calcium sulfate, and after removal of the drying agent by filtration, the solvent was distilled off in vacuo. The product, 3-methyl-1-penten-3-yl acetoacetate was distilled at reduced pressure as a water-white liquid, B. P. 58°–60° (0.9 mm.); $n_D^{25}=1.4426$.

To a solution of 92 g. of sodium in 2 liters of ethanol was added, at 10°, 883 g. of 3-methyl-1-penten-3-yl acetoacetate. To this solution was added, during three hours at 10°, 436 g. of ethyl bromide. The mixture was stirred for 20 hours at room temperature. Then, the precipitate of sodium bromide was removed by filtration. The resulting solution was concentrated in vacuo, and the crude product was dissolved in petroleum ether. It was washed with ice-cold 4% aqueous sodium hydroxide solution to remove excess 3-methyl-1-penten-3-yl acetoacetate, with cold dilute acetic acid, and finally with water until neutral. The solvent layer was dried over calcium sulfate, concentrated, and finally distilled in vacuo. The product, ethyl methyl vinyl carbinyl α-ethyl-acetoacetate, was collected at 57°–62° (0.2 mm.); $n_D^{25}=1.4415$.

400 g. of ethyl methyl vinyl carbinyl α-ethyl-acetoacetate was placed in a 1-liter, 3-neck flask, and, with vigorous stirring, was heated to 160°–170°, whereupon a rapid evolution of carbon dioxide occurred. Heating was continued until the evolution of gas ceased. The product, 3-ethyl-6-methyl-5-octen-2-one, was isolated by vacuum fractional distillation. It had B. P. 104° (22 mm.); $n_D^{25}=1.4450$.

Acetylene was bubbled rapidly into a solution of 138 g. of sodium in 2 liters of liquid ammonia until the characteristic blue color disappeared. Then, while the addition of acetylene was continued at a diminished rate, a solution of 840 g. of 3-ethyl-6-methyl-5-octen-2-one in 750 cc. of dry diethyl ether was added, dropwise, with efficient stirring, during two hours. Stirring was continued for 20 hours, in an acetylene atmosphere. Then, the ammonia was removed by evaporation, and the resulting solution was poured cautiously, with external cooling, into 2.5 liters of a stirred solution of 15% aqueous sulfuric acid, at such a rate that the temperature did not exceed 20°. The organic layer was separated, and the aqueous layer was extracted with 250 cc. of diethyl ether. The combined ether layers were washed with sodium bicarbonate solution, and then with water until neutral. After being dried over calcium sulfate, the organic portion was concentrated in vacuo and distilled. The product, 3-7-dimethyl-4-ethyl-6-nonen-1-yn-3-ol, was obtained as a colorless liquid at 82°–84° (1.4 mm.); $n_D^{25}=1.4682$.

To a mixture of 436.5 g. of 3,7-dimethyl-4-ethyl-6-nonen-1-yn-3-ol and 400 cc. of petroleum ether was added 4.5 cc. each of pyridine and acetic acid. To this solution was added dropwise, with stirring, 208.1 g. of diketene over a period of two hours. Sufficient external cooling was employed to maintain a reaction temperature of 25°–30°. After eight hours, the reaction mixture was washed successively with 15% aqueous sulfuric acid, saturated aqueous sodium bicarbonate solution, and then water until neutral. It was dried over calcium sulfate, and concentrated in vacuo, leaving the product, 3,7-dimethyl-4-ethyl-6-nonen-1-yn-3-yl acetoacetate, $n_D^{25}=1.4703$.

*Example 9*

A mixture of 290 g. of racemic 3,7-dimethyl-4-allyl-6-nonen-1-yn-3-yl acetoacetate (prepared by condensing diketene with 3,7-dimethyl-4-allyl-6-nonen-1-yn-3-ol) and 290 g. of 3,7-dimethyl-4-allyl-6-nonen-1-yn-3-ol was placed in a 1-liter, 3-neck flask. The flask was then heated by an oil bath to 150°–155° so that carbon dioxide was eliminated from the reaction mixture. When the evolution of carbon dioxide had ceased, the mixture was diluted with 300 cc. of petroleum ether, and was extracted several times with saturated aqueous sodium bicarbonate solution, and was then washed with water until neutral. The organic layer was dried over calcium sulfate and subjected to vacuum fractional distillation. The product, 4-[2-methyl-3-allyl-5-(2-buten-2-yl)-1-cyclopenten-1-yl]-2-butanone, was obtained in a fraction having B. P. 107°–110° (0.7 mm.); $n_D^{25}=1.4898$; M. P. of semicarbazone, 122°.

The starting materials for this example, 3,7-dimethyl-4-allyl-6-nonen-1-yn-3-ol and 3,7-dimethyl-4-allyl-6-nonen-1-yn-3-yl acetoacetate, were prepared by the following procedure (not part of the present invention):

To a solution of 92 g. of sodium in 2 liters of ethanol was added, at 10°, 883 g. of 3-methyl-1-penten-3-yl acetoacetate. To this solution was added, during three hours at 10°, 484 g. of allyl bromide. The mixture was stirred for 20 hours at room temperature. Then, the precipitate of sodium bromide was removed by filtration. The resulting solution was concentrated in vacuo, and the crude product was dissolved in petroleum ether. It was washed with ice-cold 4% aqueous sodium hydroxide solution to remove excess 3-methyl-1-penten-3-yl acetoacetate, with cold dilute acetic acid, and finally with water until neutral. The solvent layer was dried over calcium sulfate, concentrated, and finally distilled in vacuo. The product, ether methyl vinyl carbinyl α-allyl-acetoacetate, was collected at 75°–80° (0.7 mm.); $n_D^{25}=1.4532$.

400 g. of ethyl methyl vinyl carbinyl α-allyl-acetoacetate was placed in a 1-liter, 3-neck flask, and, with vigorous stirring, was heated to 160°–170°, whereupon a rapid evolution of carbon dioxide occurred. Heating was continued until the evolution of gas ceased. The product, 3-allyl-6-methyl-5-octen-2-one, was isolated by vacuum fractional distillation. It had B. P. 114° (18 mm.); $n_D^{25}=1.457-1.458$.

Acetylene was bubbled rapidly into a solution of 138 g. of sodium in 2 liters of liquid ammonia until the characteristic blue color disappeared. Then, while the addition of acetylene was continued at a diminished rate, a solution of 900 g. of 3-allyl-6-methyl-5-octen-2-one in 750 cc. of dry diethyl ether was added, dropwise, with efficient stirring, during two hours. Stirring was continued for 20 hours, in an acetylene atmosphere. Then, the ammonia was removed by evaporation, and the resulting solution was poured cautiously, with external cooling, into 2.5 liters of a stirred solution of 15% aqueous sulfuric acid, at such a rate that the temperature did not exceed 20°. The organic layer was separated, and the aqueous layer was extracted with 250 cc. of diethyl ether. The combined ether layers were washed with sodium bicarbonate solution, and then with water until neutral. After being dried over calcium sulfate, the organic portion was concentrated in vacuo and distilled. The product, 3,7-dimethyl-4-allyl-6-nonen-1-yn-3-ol, was obtained as a colorless liquid at 83°–85° (0.6 mm.); $n_D^{25}=1.4780$.

To a mixture of 463.5 g. of 3,7-dimethyl-4-allyl-6-nonen-1-yn-3-ol and 400 cc. of petroleum ether was added 4.5 cc. each of pyridine and acetic acid. To this solution was added dropwise, with stirring, 208.1 g. of diketene over a period of two hours. Sufficient external cooling was employed to maintain a reaction temperature of 25°–30°. After eight hours, the reaction mixture was washed succesively with 15% aqueous sulfuric acid, saturated aqueous sodium bicarbonate solution, and then water until neutral. It was dried over calcium sulfate, and concentrated in vacuo, leaving the product, 3,7-dimethyl-4-allyl-6-nonen-1-yn-3-yl acetoacetate, $$n_D^{25}=1.4792$$

This application is a continuation-in-part of our prior copending application Serial No. 535,273, filed September 19, 1955, now abandoned.

We claim:
1. A compound having the formula

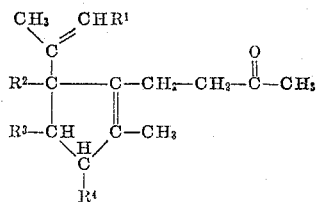

wherein each of the symbols $R^1$, $R^2$, $R^3$ and $R^4$ represents a member selected from the group consisting of hydrogen and lower acyclic hydrocarbon radicals.

2. 4-(2-methyl-5-isopropenyl-1-cyclopenten-1-yl)-2-butanone.

3. 4-(2,5-dimethyl-5-isopropenyl-1-cyclopenten-1-yl)-2-butanone.

4. 4-[2-methyl-5-(2-buten-2-yl)-1-cyclopenten-1-yl]-2-butanone.

5. 4-[2-methyl-5-(4-methyl-2-penten-2-yl)-1 - cyclopenten-1-yl]-2-butanone.

6. 4-(2-methyl-3-allyl-5-isopropenyl-1 - cyclopenten - 1-yl)-2-butanone.

7. A process of making a compound having the formula

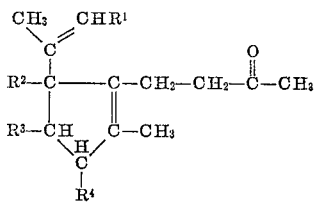

which comprises heating a compound of the formula

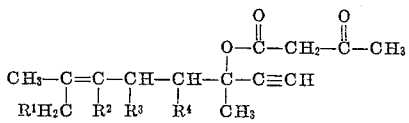

with a compound of the formula

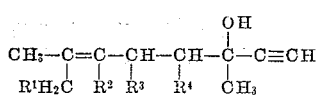

at a temperature between about 130° C. and about 160° C.; wherein, in the foregoing formulas, each of the symbols $R^1$, $R^2$, $R^3$ and $R^4$ represents a member selected from the group consisting of hydrogen and lower acyclic hydrocarbon radicals, and any particular symbol has the identical significance in each of the three formulas.

8. A process of making 4-(2-methyl-5-isopropenyl-1-cyclopenten-1-yl)-2-butanone which comprises heating 3,7-dimethyl-6-octen-1-yn-3-yl acetoacetate in the presence of 3,7-dimethyl-6-octen-1-yn-3-ol at a temperature between about 130° C. and 160° C.

9. A process of making 4-(2,5-dimethyl-5-isopropenyl-1-cyclopenten-1-yl)-2-butanone which comprises heating 3,6,7-trimethyl-6-octen-1-yn-3-yl acetoacetate in the presence of 3,6,7-trimethyl-6-octen-1-yn-3-ol at a temperature between about 130° C. and 160° C.

10. A process of making 4-[2-methyl-5-(2-buten-2-yl)-1-cyclopenten-1-yl]-2-butanone which comprises heating 3,7-dimethyl-6-nonen-1-yn-3-yl acetoacetate in the presence of 3,7-dimethyl-6-nonen-1-yn-3-ol at a temperature between about 130° C. and 160° C.

11. A process of making 4-[2-methyl-5-(4-methyl-2-penten-2-yl)-1-cyclopenten-1-yl]-2-butanone which comprises heating 3,7,9-trimethyl-6-decen-1-yn-3-yl acetoacetate in the presence of 3,7,9-trimethyl-6-decen-1-yn-3-ol at a temperature between about 130° C. and 160° C.

12. A process of making 4-(2-methyl-3-allyl-5-isopropenyl-1-cyclopenten-1-yl)-2-butanone which comprises heating 3,7-dimethyl-4-allyl-6-octen-1-yn-3-yl acetoacetate in the presence of 3,7-dimethyl-4-allyl-6-octen-1-yn-3-ol at a temperature between about 130° C. and 160° C.

No references cited.